US008035509B2

(12) United States Patent  
Jung et al.

(10) Patent No.: US 8,035,509 B2  
(45) Date of Patent: Oct. 11, 2011

(54) STIMULATING A MOTE NETWORK FOR CUES TO MOTE LOCATION AND LAYOUT

(75) Inventors: Edward K. Y. Jung, Bellevue, WA (US); Alexander J. Cohen, Mill Valley, CA (US); John D. Rinaldo, Jr., Bellevue, WA (US); Mark A. Malamud, Seattle, WA (US); Robert W. Lord, Seattle, WA (US); Royce A. Levien, Lexington, MA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1010 days.

(21) Appl. No.: 11/213,315

(22) Filed: Aug. 26, 2005

(65) Prior Publication Data  
US 2007/0046497 A1 Mar. 1, 2007

(51) Int. Cl.  
*G08B 1/08* (2006.01)

(52) U.S. Cl. ............ 340/539.13; 340/286.01; 340/825.6

(58) Field of Classification Search ............. 340/825.06, 340/525, 508, 286.01, 825.6, 539.13; 370/338, 370/400; 709/220; 342/457, 419; 379/59  
See application file for complete search history.

(56) References Cited

U.S. PATENT DOCUMENTS

| | | | |
|---|---|---|---|
| 5,052,854 A | 10/1991 | Correa et al. | |
| 5,485,163 A * | 1/1996 | Singer et al. | 342/457 |
| 5,608,412 A | 3/1997 | Welles, II et al. | |
| 5,650,800 A | 7/1997 | Benson | |
| 5,673,039 A | 9/1997 | Pietzsch et al. | |
| 5,947,637 A | 9/1999 | Neuling | |
| 6,091,959 A * | 7/2000 | Souissi et al. | 340/825.49 |
| 6,206,610 B1 | 3/2001 | Neuling | |
| 6,208,247 B1 | 3/2001 | Agre et al. | |
| 6,305,874 B1 | 10/2001 | Custers et al. | |
| 6,559,774 B2 | 5/2003 | Bergan et al. | |
| 6,592,465 B2 * | 7/2003 | Lutz et al. | 473/198 |
| 6,650,800 B2 * | 11/2003 | Litvin | 385/15 |
| 6,735,630 B1 | 5/2004 | Gelvin et al. | |
| 6,816,862 B2 | 11/2004 | Mulgund et al. | |
| 6,900,740 B2 | 5/2005 | Bloomquist et al. | |
| 6,975,229 B2 | 12/2005 | Carrender | |
| 6,989,753 B1 | 1/2006 | Lamming et al. | |
| 7,021,857 B2 | 4/2006 | Van Der Poel | |
| 7,025,525 B2 | 4/2006 | Van Der Poel | |
| 7,030,777 B1 | 4/2006 | Nelson et al. | |
| 7,051,115 B2 | 5/2006 | Chen et al. | |
| 7,136,782 B1 | 11/2006 | Araki et al. | |
| 7,147,400 B2 | 12/2006 | Van Der Poel | |
| 7,177,643 B2 * | 2/2007 | Howard | 455/445 |
| 7,271,736 B2 | 9/2007 | Siegel et al. | |
| 7,313,405 B2 * | 12/2007 | Tanabe | 455/456.2 |
| 7,378,962 B2 | 5/2008 | Odenwald et al. | |
| 7,400,594 B2 | 7/2008 | Pereira et al. | |
| 7,429,936 B2 | 9/2008 | Paradiso et al. | |
| 7,446,801 B2 | 11/2008 | Iizuka | |
| 7,516,848 B1 | 4/2009 | Shakes et al. | |

(Continued)

OTHER PUBLICATIONS

Turon, Martin; "Mote-View: A Sensor Network Monitoring and Management Tool"; EmNetS-II Proceedings; 2005; pp. 11-17; IEEE.

(Continued)

*Primary Examiner* — Daniel Previl

(57) ABSTRACT

A mote sensor may include and/or involve logic to respond to an external signal by providing one or more return signals indicative of at least one location of the mote sensor.

38 Claims, 2 Drawing Sheets

U.S. PATENT DOCUMENTS

| | | | |
|---|---|---|---|
| 7,526,944 B2 | 5/2009 | Sabata et al. | |
| 2003/0012168 A1* | 1/2003 | Elson et al. | 370/338 |
| 2003/0164763 A1 | 9/2003 | Hisano et al. | |
| 2003/0172221 A1 | 9/2003 | McNeil | |
| 2003/0236856 A1 | 12/2003 | Bird et al. | |
| 2003/0236866 A1* | 12/2003 | Light | 709/220 |
| 2004/0029558 A1 | 2/2004 | Liu | |
| 2004/0082341 A1 | 4/2004 | Stanforth | |
| 2004/0128097 A1 | 7/2004 | LaMarca et al. | |
| 2004/0139110 A1 | 7/2004 | LaMarca et al. | |
| 2004/0215750 A1 | 10/2004 | Stilp | |
| 2005/0062603 A1 | 3/2005 | Fuerst et al. | |
| 2005/0104973 A1 | 5/2005 | Iizuka | |
| 2005/0222933 A1 | 10/2005 | Wesby | |
| 2005/0285740 A1 | 12/2005 | Kubach et al. | |
| 2006/0109084 A1 | 5/2006 | Yarvis | |
| 2006/0176169 A1 | 8/2006 | Doolin et al. | |
| 2006/0247844 A1 | 11/2006 | Wang et al. | |
| 2007/0041352 A1* | 2/2007 | Frankel et al. | 370/338 |
| 2007/0052543 A1 | 3/2007 | Albarado | |
| 2007/0058634 A1 | 3/2007 | Gupta et al. | |
| 2007/0111735 A1 | 5/2007 | Srinivasan et al. | |

OTHER PUBLICATIONS

Chad Jenkins, Actuated Sensor Networks, Brown Computer Science WiCS Lunch, Nov. 3, 2004, Brown University, www.cs.brown.edu/~cjenkins/tmp/actuated_sensomets.pdf.

Dragos Niculescu & Badri Nath, Ad Hoc Positioning System (APS) Using AOA, DATAMAN Lab Rutgers University, IEEE INFOCOM 2003.

Grabowski, Robert, et al.; "Calamari: a sensor field localization system"; University of California at Berkeley; pp. 1-4; www.cs.berkeley.edu/kamin/calamari/; printed on Sep. 20, 2005.

Lorincz, Konrad, et al.; "MoteTrack: A Robust, Decentralized Approach to RF-Based Location Tracking"; Harvard University Division of Engineering and Applied Sciences; Aug. 25, 2005; pp. 1-17; Cambridge, MA, USA.

Whitehouse, Kamin, et al.; "Localization—Millibots"; Carnegie Mellon University; pp. 1-3; http://www.contrib.andrew.cmu.edu/~rjg/millibots/millibot_localization.html; printed on Sep. 20, 2005.

* cited by examiner

1

STIMULATING A MOTE NETWORK FOR CUES TO MOTE LOCATION AND LAYOUT

TECHNICAL FIELD

The present disclosure relates to mote networks and more particularly to determination of location of mote networks and/or motes thereof.

BACKGROUND

Mote networks are useful in many applications, but due to the small size of the mote sensors it is often challenging to maintain adequate information about the location and/or layout of the network and/or motes thereof.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

A method may include and/or involve signaling at least one mote network to cause at least one mote of the network to provide one or more return signals indicative of at least one location of the at least one mote. Signaling at least one mote network to cause at least one mote of the network to provide one or more return signals indicative of at least one location of the at least one mote may include and/or involve, signaling the at least one mote network to cause the at least one mote to return at least one mote id, and/or signaling the at least one mote network to cause the at least one mote of the network to provide the one or more return signals indicative of at least one location of the at least one mote relative to at least one other mote, and/or signaling the at least one mote network to cause the at least one mote of the network to provide the one or more return signals indicative of an absolute location of the at least one mote, and/or signaling the at least one mote network to cause the at least one mote of the network to provide the one or more return signals indicative of at least one location of the at least one mote relative to at least one other mote, and to cause at least one other mote of the network to provide the one or more return signals indicative of an absolute location of the at least one other mote, and/or signaling to cause the at least one mote to be responsive to at least one subsequent signal to report location, and/or periodically signaling the at least one mote network to cause the at least one mote of the network to provide the one or more return signals indicative of the location of the at least one mote, and/or signaling the at least one mote network to cause the at least one mote of the network to provide the one or more return signals indicative of the location of the at least one mote upon occurrence of one or more events and/or conditions associated with changes in one or more mote locations, and/or signaling the at least one mote network to cause the at least one mote of the network to provide the one or more return signals indicative of the location of the at least one mote that provided an out-of-range measurement, and/or signaling the at least one mote network to cause at least one mote of the network to provide one or more return signals indicative of at least one relative location of the at least one mote with respect to at least one other mote, and/or signaling the at least one mote network to cause at least one mote of the network to provide one or more return signals indicative of at least one absolute location of the at least one mote, and/or

2 signaling the at least one mote network to cause at least one mote of the network to provide one or more return signals indicative of at least one offset from one or more previous locations of the at least one mote, and/or at least one of signaling wirelessly, signaling with sound, or signaling with light, and/or the at least one mote using energy of the signaling to provide the one or more return signals, and/or signaling the at least one mote network from one or more locations external and/or internal to the at least one mote network, and/or signaling a first mote or motes of the network and the first mote or motes providing one or more return signals, the first mote or motes signaling one or more neighbor motes, and the one or more neighbor motes providing one or more return signals. Periodically signaling at least one mote network to cause the at least one mote of the network to provide the one or more return signals indicative of at least one location of the at least one mote may include and/or involve automatically periodically signaling the at least one mote network to cause the at least one mote of the network to provide the one or more return signals indicative of the location of the at least one mote. Signaling the at least one mote network to cause the at least one mote of the network to provide the one or more return signals indicative of the location of the at least one mote upon occurrence of one or more events and/or conditions associated with changes in one or more mote locations may include and/or involve signaling the at least one mote network to cause the at least one mote of the network to provide the one or more return signals indicative of the location of the at least one mote upon receiving one or more indications from the at least one mote network that locations of one or more motes, or of the at least one mote network overall, has changed, and/or signaling the at least one mote network to cause the at least one mote of the network to provide the one or more return signals indicative of the location of the at least one mote as a result of turbulence in one or more media including the motes, and/or signaling the at least one mote network to cause the at least one mote of the network to provide the one or more return signals indicative of the location of the at least one mote when one or more motes fail, provide at least one out-of-range reading, when one or motes are removed, or when one or more aggregate readings of the at least one mote network are out-of-range. The at least one mote using energy of the signaling to provide the one or more return signals may include and/or involve the at least one mote providing at least one phosphorescent response.

The method may include and/or involve signaling at least one mote network to cause at least one mote of the network to provide one or more return signals indicative of one or more statuses and/or conditions of the at least one mote. The state or states of the at least one mote may include and/or involve at least one indication of whether the at least one mote is functioning normally, whether the at least one mote has stored data available, or whether the at least one mote is in communication with one or more mote neighbors.

The method may include and/or involve refining one or more graphical indications of mote locations according to one or more received indications of mote locations. The one or more received indications of mote location may include and/or involve one or more photographs or other representations of the at least one mote network, and/or building one or more 2D and/or 3-D models of the at least one mote network according to the one or more received indications, and/or overlaying one or more mote location indications on at least one image representing one or more mote network environments, and/or providing mote location indications via one or more of a projection system, glasses, screen, or heads up display, and/or providing the at least one indication that at least one mote has changed position, and/or providing the at least one indication that at least one mote is in a wrong or unexpected position, and/or providing the at least one indication that at least one mote is absent or not functioning at an expected position.

The method may include and/or involve refining one or more graphical indications of mote locations to reflect one or more received indications of mote status and/or condition.

The method may include and/or involve refining one or more graphical indications to reflect one or more overall statuses and/or conditions of the at least one mote network.

The method may include and/or involve one or more motes of the at least one mote network receiving and processing the one or more return signals.

The method may include and/or involve processing the one or more return signals to facilitate one or more determinations of which motes of the at least one mote network have changed location. Processing the one or more return signals to facilitate one or more determinations of which motes of the at least one mote network have changed location may include and/or involve one or more motes of the at least one mote network processing the one or more return signals of their neighbors in order to facilitate the one or more determinations of whether their neighbors have changed location.

The method may include and/or involve repeatedly signaling the at least one mote network, capturing photos of light emitted by the one or more motes in response to the signaling, and creating one or more combined photos including two or more of the captured photos.

The method may include and/or involve comparing at least one measured mote network topology with at least one desired or expected mote network topology.

The method may include and/or involve at least one mote providing the one or more return signals via light, the one or more return signals captured by two or more cameras located at different places, and applying the one or more captured return signals to facilitate one or more 3-D location determinations for the at least one mote.

The method may include and/or involve one or more motes responding to the signaling in one or more manners that distinguish the one or more motes in the at least one mote network. The one or more motes responding in one or more manners that distinguish the one or more motes in the at least one mote network may include and/or involve one or more motes responding with at least one of (a) one or more wireless identifiers, (b) one or more distinguishing light patterns and/or colors, or (c) one or more distinguishing sounds and/or tones.

The method may include and/or involve one or more motes of at least one mote network signaling at least one other mote of the at least one mote network to provide one or more return signals indicative of locations of the at least one other mote. One or more motes of at least one mote network signaling at least one other motes of the at least one mote network to provide one or more return signals indicative of locations of the at least one other motes may include and/or involve one or more motes of the at least one mote network signaling one or more neighboring motes to provide the one or more return signals when the one or more neighboring motes provide one or more out-of-range readings, and/or one or more motes of the at least one mote network signaling one or more neighboring motes to provide the one or more return signals when the one or more neighboring motes fail to respond as expected, and/or one or more motes of the at least one mote network signaling one or more neighboring motes to provide the one or more return signals when the one or more neighboring motes provide a signal that is below an expected signal strength.

A mote sensor may include and/or involve logic to respond to an external signal by providing one or more return signals indicative of at least one location of the mote sensor. The logic to respond to an external signal by providing one or more return signals indicative of at least one location of the mote sensor may include and/or involve logic to respond with at least one mote id, and/or logic to provide the one or more return signals indicative of at least one location relative to at least one other mote, and/or logic to provide the one or more return signals indicative of an absolute location of the mote, and/or signaling the at least one mote network to cause the at least one mote of the network to provide the one or more return signals indicative of at least one location of the at least one mote relative to at least one other mote, and to cause at least one other mote of the network to provide the one or more return signals indicative of an absolute location of the at least one other mote, and/or logic to receive at least one first signal preparing the mote to respond to at least one subsequent signal to report location, and/or logic to provide the one or more return signals indicative of the location of the mote upon occurrence of one or more events and/or conditions associated with changes in the mote's location, and/or logic to provide the one or more return signals indicative of the location of the mote upon at least one change of location of the mote, and/or logic to provide one or more return signals indicative of at least one offset from one or more previous locations of the mote, and/or logic to signal wirelessly, with sound, and/or with light, and/or logic to apply energy from the external signal to provide the one or more return signals, and/or logic to signal one or more neighbor motes to provide one or more return signals of location, and/or logic to receive and process one or more return signals from other motes, and/or logic to process one or more return signals to facilitate one or more determinations of which other motes of a mote network have changed location, and/or logic to respond to the signaling in one or more manners that distinguish the mote from other motes in a mote network. Logic to provide the one or more return signals indicative of the location of the mote upon occurrence of one or more events and/or conditions associated with changes in the mote's location may include and/or involve logic to provide the one or more return signals indicative of the location of the mote as a result of turbulence in one or more media including the mote. The logic to apply energy from the external signal to provide the one or more return signals may include and/or involve logic to provide at least one phosphorescent response. The logic to respond to an external signal by providing one or more return signals indicative of at least one location of the mote sensor may include and/or involve logic to respond with at least one of (a) one or more wireless identifiers, (b) one or more distinguishing light patterns and/or colors, or (c) one or more distinguishing sounds and/or tones.

The mote may include and/or involve logic to provide one or more return signals indicative of one or more statuses and/or conditions of the mote. Logic to provide one or more return signals indicative of one or more statuses and/or conditions of the mote may include and/or involve logic to provide at least one indication of whether the mote is functioning normally, whether the mote has stored data available, or whether the mote is in communication with one or more mote neighbors.

The mote may include and/or involve logic to signal at least one other mote of a mote network to provide one or more return signals indicative of locations of the at least one other motes. The logic to signal at least one other mote of a mote network to provide one or more return signals indicative of locations of the at least one other motes may include and/or involve logic to signal one or more neighboring motes to provide the one or more return signals when the one or more neighboring motes provide one or more out-of-range readings, and/or logic to signal one or more neighboring motes to provide the one or more return signals when the one or more neighboring motes fail to respond as expected, and/or logic to signal one or more neighboring motes to provide the one or more return signals when the one or more neighboring motes provide a signal that is below an expected signal strength.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

System for Determining Mote Locations and/or Mote Network Layout

Figure 1:
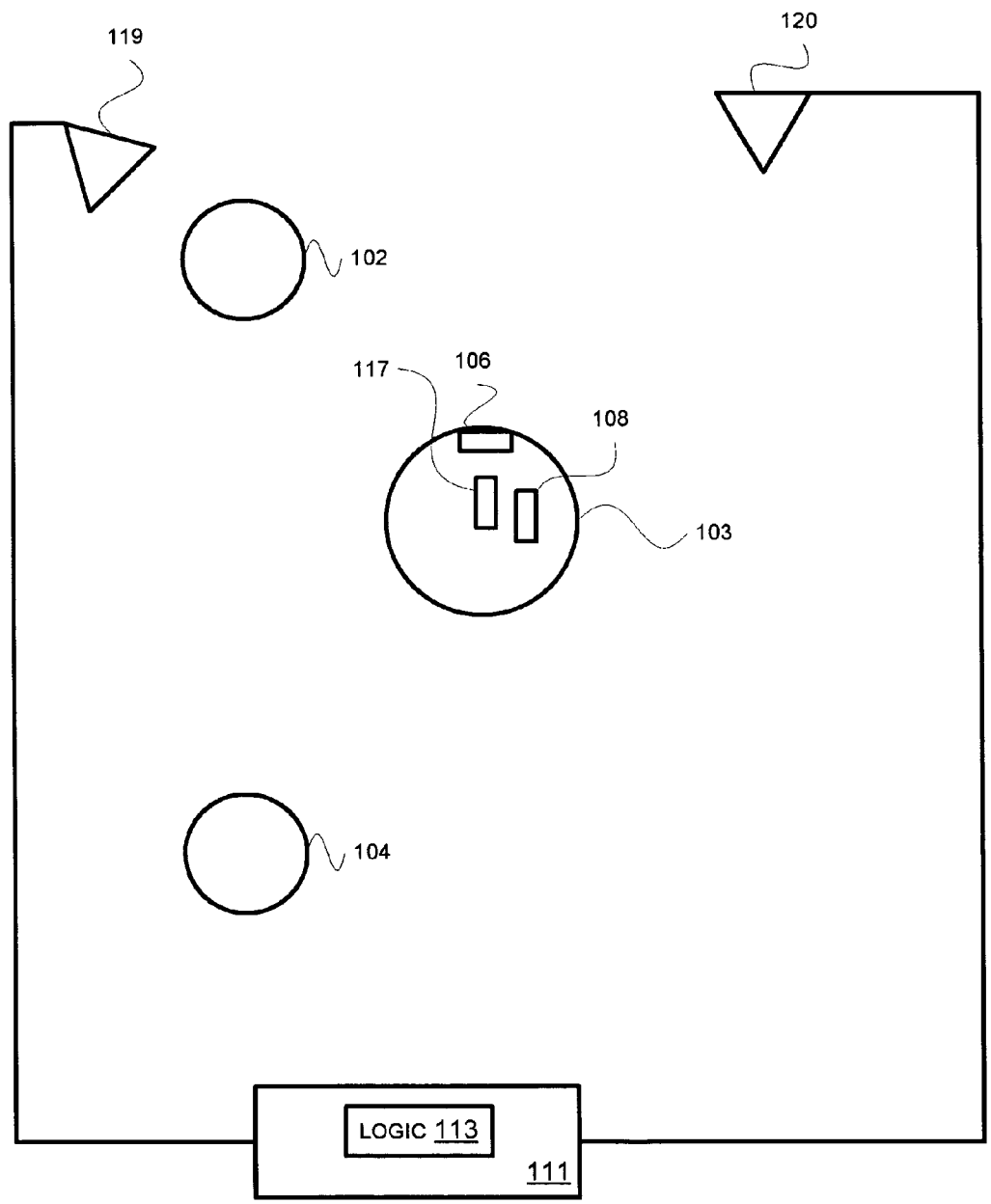
FIG. 1 is a block diagram of an embodiment of a system for determining mote locations and/or mote network layout.

FIG. 1 is a block diagram of an embodiment of a system for determining mote locations and/or mote network layout. In order to simplify the description, the network shown includes three mote sensors 102-104, although a mote network may include more or fewer (typically more) mote sensors in practice.

Elements of a mote sensor 103 are shown. Other mote sensors may comprise similar elements.

Mote sensor 103 comprises logic 108. The logic 108 (which may include memory) may be applied to cause the mote sensor to facilitate acts described herein.

Mote sensor 103 further comprises a communication interface 106. The mote 103 may employ this interface to communicate with other motes and/or devices external to the mote network. Communication may be accomplished wirelessly via radio frequency, using light, using sound, or by other mechanisms known in the art.

Mote sensor 103 further comprises an actuator/sensor 117. The actuator/sensor 117 may sense and/or produce light, sound, temperature, pressure, particular molecules, or other things. Not all embodiments will include these features, but they may be present in others.

Device 111 is an example of an external device that may interact with the mote network. The device 111 may be a personal/laptop/desktop computer, handheld computing device, wireless device such as digital assistant or phone, or industrial or test equipment, to name just some of the possibilities. The external device 111 includes logic 113 to facilitate acts described herein.

The system may include image capture devices 119, 120 (e.g. cameras) at different locations. Use of the cameras 119, 120 in certain embodiments will be described.

Signaling a Mote Network in Order to Obtain Location/Layout Information

Due to the small size of mote sensors it is often important to maintain up-to-date information about the location and/or layout of the mote network and/or motes thereof.

To facilitate determination of mote location and/or layout, a signal may be communicated to a mote network (henceforth, 'signaling the mote network') to cause at least one mote of the network to provide one or more return signals. The return signals may be indicative of locations of motes of the network. Signaling the mote network may cause motes of the network to provide return signals indicative of locations of the motes. For example, in a plant growing environment, motes 102-104 may be signaled (e.g., with light). The motes 102-104 may utilize their light actuators/sensors and/or their communications interface 106 to communicate with their nearest neighbors. Although the motes may not have sufficient power to communicate back to an external source, it may be possible for their nearest neighbors to detect the response signals.

Signaling may be accomplished wirelessly, for example, with sound or light. In some implementations motes may harness energy of the signaling to provide the one or more return signals. For example, some motes may produce a wireless, visual, or acoustic echo of the incident signal. In some embodiments, motes may provide a phosphorescent response to signaling with light. For example, motes 102-104 may be present in a dark nighttime or underwater environment. When stimulated by a quick, intense light pulse, the motes 102-104 may phosphoresce, thus providing a marker to their location which could be detected by a person or cameras 119, 120.

The mote network may be signaled from one or more locations external and/or internal to the at least one mote network, e.g. by the device 111. The signal may be provided to all motes more or less simultaneously, or may propagate through the mote network. Thus, some motes may receive the signal to report location, and these first motes to receive the signal may provide one or more return signals, and may signal one or more neighbor motes to provide location. The neighbor motes may provide one or more return signals, signal their neighbors, and so on. For example, motes 102-104 may be a part of a security system over a large outdoor area. An external control device 111 may communicate to the nearest mote 104 using the mote's 104 communication interface 106, causing the mote 104 to respond with location information and signal its nearest neighbor 103. The nearest neighbor 103 may then respond to mote 104 with its location information, which information mote 104 will pass on to device 111. Mote 103 may signal neighbor mote 102, resulting in mote 102 communicating its location.

Signaling the mote network may cause at least one mote to return at least one mote id. The mote id may be used to identify which mote or motes are responding. In general, motes may respond to the signaling in any manner that distinguishes the motes in the network. For example, motes may respond with (a) one or more wireless identifiers, (b) one or more distinguishing light patterns and/or colors, or (c) one or more distinguishing sounds and/or tones. For example, motes communicating relative position or location information wirelessly may include a unique name, such as their wireless device identifier as part of the communication. Motes responding with light signals may flash in a pattern, for example, if the last two digits of their device number is 21 flashing 21 times. Motes responding using sound may respond with a particular tone, for example, by modifying the frequency of response from a base tone by adjusting an amount dependent on the mote identifier.

In some cases, the type, characteristics, or state of the mote may be indicated by the mote response. For example, motes with temperature sensors might respond to a signal by generating light at true red wavelength. Motes with pressure sensors might respond by generating light at yellow wavelength.

In some implementations the signaling may cause at least one mote of the network to provide return signals indicative of the location of the mote(s) relative to other motes as was discussed in the example where motes 102-104 returned information identifying their neighbors.

In some implementations, signaling the mote network may cause motes to provide return signals indicative of an absolute location of motes. For example, motes 102-104 used for wildfire sensing may have GPS location capability.

Some implementations may involve both types of information; some motes may provide signals indicative of their location relative to other mote(s), and some mote(s) may return signals indicative of an absolute location. For example, motes 102-104 used in a security system monitoring a large outdoor area may be of two types. Some 104 may comprise GPS location capability, sensors, and communication interfaces. Others 102 and 103 may comprise various sensors and a communication interface. The location of the second type 102 and 103 may be inferred by the known location of their reference neighbor of the first type 104, plus calculations of their approximate distance to that neighbor made using ultrasound or in some other manner.

Some implementations may signal the network to provide return signals indicative of offsets from one or more previous locations of motes that have moved. For example, in some implementations motes (such as "robot motes" networks) 102-104 may be provided with a capability for directed movement. Frequently such implementations also provide the motes with a capability to calculate how far and/or in what direction they have moved. Thus, the motes may, as required, return information on their movement from an initial or previous location.

To prevent false return signals, a "prep" signal may be provided to the mote network, to prepare motes of the network for a subsequent signal to report location. Thus, a first signal to the network may cause mote(s) to be responsive to at least one subsequent signal to report location. For example, motes in an oil pipeline may detect a sound pattern which indicates, if it is repeated three times within a certain interval, that they should report their location (and possibly other information at the same time). The first two occurrences of the sound pattern act as a prep signal, the third as a trigger.

If frequent shifts in mote location/layout are expected, periodically (possibly automatic) signaling may be applied to cause motes to periodically provide return signals indicative of their location. For example, motes 102-104 having neutral buoyancy may have been spread over a large lake, whereby they might be expected to follow currents throughout the lake. The motes 102-104 may be queried periodically so that each might identify their current location.

In some implementations, the locations/layout may be expected to shift under certain conditions. In these situations signaling the mote network may involve signaling to cause the motes to indicate their locations upon occurrence of one or more events and/or conditions associated with changes in mote location/layout (henceforth, 'conditional signaling of the mote network'). For example, the mote network may be signaled for location indications for motes that provide out-of-range measurements. Such motes may have shifted beyond the functional boundaries of the network.

Conditional signaling of the mote network may involve signaling to cause motes to provide signals indicative of their location upon receiving indications from the network that locations of some motes, or of the network overall (e.g. the entire network moved), have changed. Conditional signaling of the mote network may take place as a result of turbulence in one or more media including the motes. For example, if the motes are in air, winds may trigger the signaling. If the motes are in water, currents or waves may trigger the signaling. It may be advantageous, in certain implementations, for conditional signaling of the mote network to take place when motes fail, when motes provide out-of-range readings, when motes are removed from the network, or when one or more aggregate readings of the network (e.g. averages, statistical metrics, etc.) are out-of-range. For example, motes 102-104 may be part of a mote network with temperature sensors 117 which have been blown into a complicated ductwork structure for a large building, such that once the motes are in place, they are expected to "stick" at their location. A break in the water pipes for the building may result in water entering the ductwork system, changing the mote system both by moving motes 102 and by harming mote 103 sensors 117. Mote 102 may communicate that it has moved, and the readings from sensor 117 of mote 103 may be recognized as too hot, i.e. suspect. Recognition that the motes 102-104 may have moved or otherwise changed may occur by logic 108 within the mote network or by external logic 113. Similarly, the signal which causes the relative position or location determining response may come from either somewhere within the mote network or externally.

Processing Return Signals

Signals returned by motes may be received and processed by one or more devices external to the mote network, or by motes of the mote network that are enabled to process location information. In other words, some cases may employ external processing of the location information, whereas others will involve internal processing of the location information by the network itself. In some situations, both techniques may be employed.

The return signals may be processed to determine which motes of the network have changed location (henceforth, 'mote movement determination'). In some cases where internal processing is employed, mote movement determination may involve one or more motes of the network processing the one or more return signals of their neighbors in order to facilitate the determinations of whether they or their neighbors have changed location. In the example given previously where motes 102-104 report their nearest neighbors and this information is passed from mote to mote to a central point, the signal strength of the received messages could be identified by each receiving mote. The signal strength/distance analysis could be performed either by the receiving mote or elsewhere, possibly at a central information gathering point such as external device 111. Whenever the received signal strength was very close in value to that previously received, a determination of no mote movement may result.

In some implementations, signals may be repeatedly applied to the mote network. Photos of emitted light, or other response indications of mote location, may be captured. When light is emitted in response, one or more combined photos may be created that include the captured information. In this manner, a visual record may be compiled indicating which motes have changed location, and their relative layout. A measured mote network topology (layout) may be compared with desired or expected network topologies, to determine deviations from the expected or desired layout.

Stereoscopic applications may involve motes providing return signals via light (e.g. the motes light up in response to the signaling). Return signals may be captured by two or more cameras (e.g. cameras 119, 120) located in different places. The captured return signals may be applied to facilitate 3-D location determinations for the responding motes. Stereoscopic applications involving microphones and acoustic responses are also possible.

Self Location/Layout Monitoring by a Mote Network

The mote network may monitor changes in the position of its motes and/or in its own layout. Motes of the network may signal other motes of the network for location information (henceforth, 'mote signaling').

Mote signaling may involve motes signaling neighboring motes to provide return signals indicative of location, when the neighboring motes provide out-of-range readings. Out-of-range readings by a neighbor mote may indicate the mote has shifted position and is no longer within the functional bounds of the network. For example, if mote 102 in building ductwork becomes dislodged from its position and blows out into a room, it may start providing temperature readings of lesser value than its presumed (based on its previous position) near neighbors on either side. This may cause some of the motes 103-104 in the mote network to signal it in order to ascertain its location.

In some implementations, mote signaling may involve motes signaling their neighbors for location information when the neighbors fail to respond as expected, and/or when the neighbors provide a signal that is below an expected signal strength. These conditions may indicate that the neighbor motes have shifted out of bounds. In the ductwork example provided above, mote 102 may be so distant that its previous neighbors 103 and 104 do not receive its communications. Or, mote 102 may be sending signals which are received as "weak". Either of these situations may cause the neighboring motes 103 and/or 104 to initiate signaling of mote 102 in an attempt to ascertain its current location.

Signaling a Mote Network to Obtain Status/Condition Information

The mote network may be signaled for more than just location information. For example, the mote network may be signaled to cause motes thereof to provide return signals indicative of the status and/or condition of the motes. Examples of status/condition include whether motes are functioning normally, whether motes have stored data available, or whether motes are in communication with their neighbors.

Refining a Graphical Display

A visual map and/or layout including graphical indications of mote locations may be constructed and/or refined according to received indications of mote locations. One or more 2D and/or 3-D maps and/or models of the mote network may be formed according to the received indications of mote location. This may involve overlaying mote location indications on an image or images representing the mote network environment. The graphical location indications may in some implementations be displayed via a projection system, via glasses that a person wears, on a screen, or via a heads-up display, for example.

Received indications of mote location may include photographs or other representations of the mote network. The motes may respond to signaling with light, and these light responses may be captured by a camera and used to construct a map/layout of mote locations. For example, motes 102-104 with light sensors 117 providing phosphorescing response may be injected into a dark underwater area, such that some are expected to attach themselves to fish which frequent the area. (Sensors which do not attach to fish will leave with the current). Very fast intense strobes of light may be flashed frequently enough to maintain the fluorescing effect; and cameras 119, 120 may obtain moving images or periodic stills. The resulting images may be analyzed to provide a changing map of mote positions, and thus the fish.

Graphical location indications may indicate which motes have changed position or which are in a wrong or unexpected position. The graphical indications may also or alternatively indicate which motes are absent or not functioning at an expected position. For example, in the ductwork application provided above, a two-dimension representation of the horizontal ductwork with sensing mote locations may be available for each building floor. Normally working motes 103, 104 may be shown in with green, yellow, or orange circles, depending on the temperatures they are reporting. A suspect or non-working mote 102 may appear in its last known location, as a flashing red triangle.

In general, the graphical indications may reflect one or more received indications of mote status and/or condition, and/or overall statuses and/or conditions of the mote network itself. In the ductwork example just discussed, indications of both suspect mote data values and suspect mote locations may be distinctively captured by a graphic. When suspect conditions are found to be pervasive or prevalent, for example if several of the motes 102-104 in a mote network are no longer reporting data or are reporting suspect data, an overall network graphic or menu might be shown having different color, flashing, with more bold, or in any other visually distinctive manner. For example, a map displaying all mote locations might have its borders flashing red.

Process of Determining Mote Locations and/or Mote Network Layout

Figure 2:
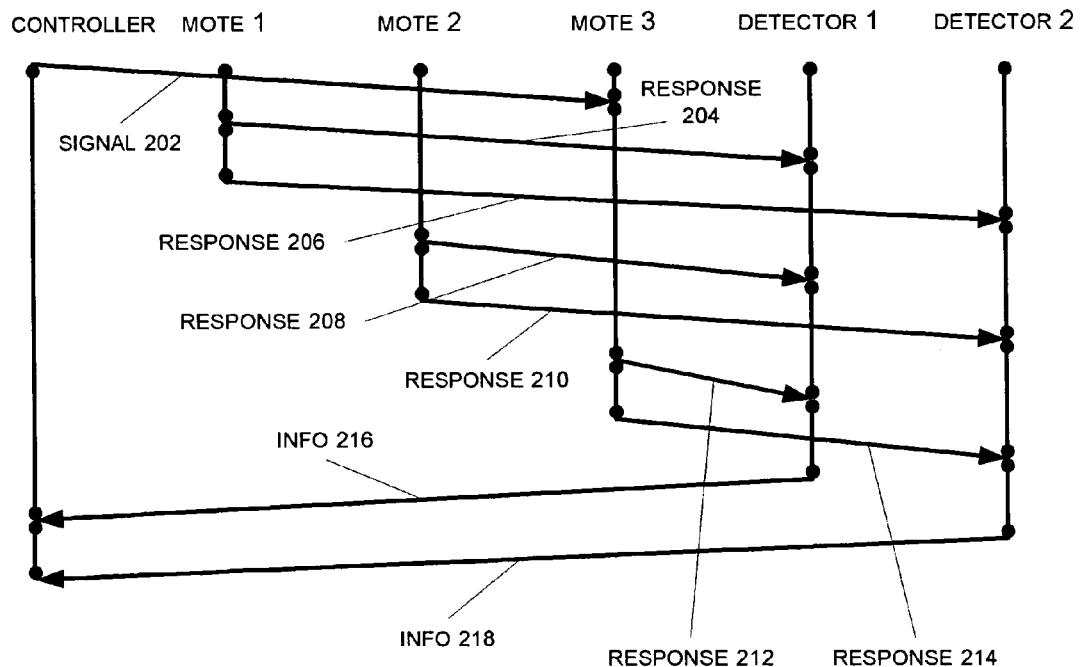
FIG. 2 is an action flow diagram of an embodiment of a process of determining mote locations and/or mote network layout.

FIG. 2 is an action flow diagram of an embodiment of a process of determining mote locations and/or mote network layout.

At 202 a controller (such as an external device 111, or one or more controller motes of a mote network) provides a signal to motes of a mote network. In some cases, the signal may be provided to motes closest to the controller, or to motes specifically enabled to recognize the controller signal. In some implementations, the controller mote(s) may in fact form a part of the mote network signalled.

Motes that receive the signal respond with location information, such as activating a light-emitting diode at their present location. Response(s) are recorded by various detectors at different locations. For example, response(s) of mote 1 may be recorded by detectors 1 and 2 at 204, 206, respectively. Response(s) of mote 2 may be recorded by detectors 1 and 2 at 208, 210, respectively. Response(s) of mote 3 may be recorded by detectors 1 and 2 at 212, 214, respectively.

The detectors may provide the recorded mote responses to the controller, either together or as the responses are recorded. Detectors 1 and 2 provide the responses to the controller at 216, 218, respectively. The controller may then process the responses into graphical indications of mote location and/or layout.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include—as appropriate to context and application—all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Nextel, etc.), etc.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method comprising:
    signaling at least one mote network to cause at least one mote of the network to provide one or more return signals indicative of at least one location of the at least one mote, including signaling the at least one mote network to cause the at least one mote of the network to provide the one or more return signals indicative of the location of the at least one mote upon occurrence of one or more events and/or conditions associated with changes in one or more mote locations, wherein the mote network comprises one or more motes that are configured to signal neighbor motes.

2. The method of claim 1, wherein signaling at least one mote network to cause at least one mote of the network to provide one or more return signals indicative of at least one location of the at least one mote further comprises:
    signaling the at least one mote network to cause the at least one mote of the network to provide the one or more return signals indicative of at least one location of the at least one mote relative to at least one other mote.

3. The method of claim 1, wherein signaling at least one mote network to cause at least one mote of the network to provide one or more return signals indicative of at least one location of the at least one mote further comprises:
    signaling the at least one mote network to cause the at least one mote of the network to provide the one or more return signals indicative of an absolute location of the at least one mote.

4. The method of claim 1, wherein signaling the at least one mote network to cause the at least one mote of the network to provide the one or more return signals indicative of the location of the at least one mote upon occurrence of one or more events and/or conditions associated with changes in one or more mote locations further comprises:
    signaling the at least one mote network to cause the at least one mote of the network to provide the one or more return signals indicative of the location of the at least one mote as a result of turbulence in one or more media comprising the motes.

5. The method of claim 1, wherein signaling the at least one mote network to cause the at least one mote of the network to provide the one or more return signals indicative of the location of the at least one mote upon occurrence of one or more events and/or conditions associated with changes in one or more mote locations further comprises:
signaling the at least one mote network to cause the at least one mote of the network to provide the one or more return signals indicative of the location of the at least one mote when one or more motes fail, provide at least one out-of-range reading, when one or motes are removed, or when one or more aggregate readings of the at least one mote network are out-of-range.

6. The method of claim 1, wherein signaling at least one mote network to cause at least one mote of the network to provide one or more return signals indicative of at least one location of the at least one mote further comprises:
signaling the at least one mote network to cause the at least one mote of the network to provide the one or more return signals indicative of the location of the at least one mote that provided an out-of-range measurement.

7. The method of claim 1, wherein signaling at least one mote network to cause at least one mote of the network to provide one or more return signals indicative of at least one location of the at least one mote further comprises:
signaling the at least one mote network to cause at least one mote of the network to provide one or more return signals indicative of at least one offset from one or more previous locations of the at least one mote.

8. The method of claim 1, wherein signaling at least one mote network to cause at least one mote of the network to provide one or more return signals indicative of at least one location of the at least one mote further comprises:
the at least one mote using energy of the signaling to provide the one or more return signals.

9. The method of claim 8, wherein the at least one mote using energy of the signaling to provide the one or more return signals further comprises:
the at least one mote providing at least one phosphorescent response.

10. The method of claim 1, wherein signaling at least one mote network to cause at least one mote of the network to provide one or more return signals indicative of at least one location of the at least one mote further comprises:
signaling a first mote or motes of the network and the first mote or motes providing one or more return signals, the first mote or motes signaling one or more neighbor motes, and the one or more neighbor motes providing one or more return signals.

11. The method of claim 1, further comprising:
signaling at least one mote network to cause at least one mote of the network to provide one or more return signals indicative of one or more statuses and/or conditions of the at least one mote.

12. The method of claim 11, further comprising:
refining one or more graphical indications of mote locations to reflect one or more received indications of mote status and/or condition.

13. The method of claim 11, further comprising:
refining one or more graphical indications to reflect one or more overall statuses and/or conditions of the at least one mote network.

14. The method of claim 1, further comprising:
refining one or more graphical indications of mote locations according to one or more received indications of one or more mote locations.

15. The method of claim 14, wherein the one or more received indications of one or more mote locations further comprises:
one or more photographs or other representations of the at least one mote network.

16. The method of claim 14, wherein the refining one or more graphical indications of one or more mote locations according to one or more received indications of one or more mote locations further comprises:
building one or more 2D and/or 3-D models of the at least one mote network according to the one or more received indications.

17. The method of claim 14, wherein refining one or more graphical indications of one or more mote locations according to one or more received indications of one or more mote locations further comprises:
overlaying one or more mote location indications on at least one image representing one or more mote network environments.

18. The method of claim 14, wherein refining one or more graphical indications of one or more mote locations according to one or more received indications of one or more mote locations further comprises:
providing the at least one indication that at least one mote has changed position.

19. The method of claim 14, wherein refining one or more graphical indications of one or more mote locations according to one or more received indications of one or more mote locations further comprises:
providing the at least one indication that at least one mote is in a wrong or unexpected position.

20. The method of claim 14, wherein refining one or more graphical indications of one or more mote locations according to one or more received indications of one or more mote locations further comprises:
providing the at least one indication that at least one mote is absent or not functioning at an expected position.

21. The method of claim 1, further comprising:
repeatedly signaling the at least one mote network, capturing photos of light emitted by the one or more motes in response to the signaling, and creating one or more combined photos comprising two or more of the captured photos.

22. The method of claim 1, further comprising:
comparing at least one measured mote network topology with at least one desired or expected mote network topology.

23. The method of claim 1, further comprising:
at least one mote providing the one or more return signals via light, the one or more return signals captured by two or more cameras located at different places, and applying the one or more captured return signals to facilitate one or more 3-D location determinations for the at least one mote.

24. The method of claim 1, further comprising:
one or more motes responding to the signaling in one or more manners that distinguish the one or more motes in the at least one mote network.

25. The method of claim 24, wherein the one or more motes responding to the signaling in one or more manners that distinguish the one or more motes in the at least one mote network further comprises:
one or more motes responding with at least one of (a) one or more wireless identifiers, (b) one or more distinguishing light patterns and/or colors, or (c) one or more distinguishing sounds and/or tones.

26. A method comprising:
one or more motes of at least one mote network signaling at least one other mote of the at least one mote network to provide one or more return signals indicative of one or more locations of the at least one other mote, including signaling the at least one mote network to cause the at least one mote of the network to provide the one or more return signals indicative of the location of the at least one mote upon occurrence of one or more events and/or conditions associated with changes in one or more mote locations, wherein the mote network comprises one or more motes that are configured to signal neighbor motes.

27. The method of claim 26, wherein one or more motes of at least one mote network signaling at least one other mote of the at least one mote network to provide one or more return signals indicative of one or more locations of the at least one other mote further comprises:
one or more motes of the at least one mote network signaling one or more neighboring motes to provide the one or more return signals when the one or more neighboring motes provide one or more out-of-range readings.

28. The method of claim 26, wherein one or more motes of at least one mote network signaling at least one other mote of the at least one mote network to provide one or more return signals indicative of one or more locations of the at least one other mote further comprises:
one or more motes of the at least one mote network signaling one or more neighboring motes to provide the one or more return signals when the one or more neighboring motes provide a signal that is below an expected signal strength.

29. A mote sensor comprising:
logic to respond to an external signal by providing one or more return signals indicative of at least one location of the mote sensor, including logic to provide the one or more return signals indicative of the location of the mote upon occurrence of one or more events and/or conditions associated with changes in the mote's location, wherein the mote sensor is configured to signal neighbor mote sensors.

30. The mote of claim 29, wherein the logic to respond to an external signal by providing one or more return signals indicative of at least one location of the mote sensor further comprises:
signaling the at least one mote network to cause the at least one mote of the network to provide the one or more return signals indicative of at least one location of the at least one mote relative to at least one other mote, and to cause at least one other mote of the network to provide the one or more return signals indicative of an absolute location of the at least one other mote.

31. The mote of claim 29, wherein the logic to respond to an external signal by providing one or more return signals indicative of at least one location of the mote sensor further comprises:
logic to receive at least one first signal preparing the mote to respond to at least one subsequent signal to report location.

32. The mote of claim 29, wherein the logic to respond to an external signal by providing one or more return signals indicative of at least one location of the mote sensor further comprises:
logic to provide the one or more return signals indicative of the location of the mote upon occurrence of one or more events and/or conditions associated with changes in the mote's location as a result of turbulence in one or more media comprising the motes.

33. The mote of claim 29, wherein the logic to respond to an external signal by providing one or more return signals indicative of at least one location of the mote sensor further comprises:
logic to signal one or more neighbor motes to provide one or more return signals of location.

34. The mote of claim 29, further comprising:
logic to provide one or more return signals indicative of one or more statuses and/or conditions of the mote.

35. The mote of claim 34, wherein logic to provide one or more return signals indicative of one or more statuses and/or conditions of the mote further comprises:
logic to provide at least one indication of whether the mote is functioning normally, whether the mote has stored data available, or whether the mote is in communication with one or more mote neighbors.

36. A mote comprising:
logic to signal at least one other mote of a mote network to provide one or more return signals indicative of a location of the at least one other mote, including logic to provide the one or more return signals indicative of the location of the mote upon occurrence of one or more events and/or conditions associated with changes in the mote's location, wherein the mote is configured to signal the at least one other mote.

37. The mote of claim 36, wherein the logic to signal at least one other mote of a mote network to provide one or more return signals indicative of a location of the at least one other mote further comprises:
logic to signal one or more neighboring motes to provide the one or more return signals when the one or more neighboring motes provide one or more out-of-range readings.

38. The mote of claim 36, wherein the logic to signal at least one other mote of a mote network to provide one or more return signals indicative of a location of the at least one other mote further comprises:
logic to signal one or more neighboring motes to provide the one or more return signals when the one or more neighboring motes provide a signal that is below an expected signal strength.

* * * * *